United States Patent [19]
Murata et al.

[11] Patent Number: 5,877,301
[45] Date of Patent: Mar. 2, 1999

[54] BENZOTHIAZOLE AZO DYE AND THERMAL TRANSFER SHEET EMPLOYING IT

[75] Inventors: Yukichi Murata; Mio Ishida, both of Yokohama, Japan

[73] Assignee: Mitsubishi Chemical Corporation, Tokyo, Japan

[21] Appl. No.: 972,144

[22] Filed: Nov. 17, 1997

[30] Foreign Application Priority Data

Nov. 22, 1996 [JP] Japan ..................................... 8-311704

[51] Int. Cl.$^6$ ........................ C09B 29/045; B41M 5/035; B41M 5/38
[52] U.S. Cl. .......................... 534/788; 503/227; 428/195; 428/913; 428/914; 8/471
[58] Field of Search ............................. 534/788; 503/227; 428/195, 913, 914; 8/471

[56] References Cited

U.S. PATENT DOCUMENTS 4,488,992  12/1984  Yoshinaga et al. ..................... 534/788

FOREIGN PATENT DOCUMENTS

| | | | |
|---|---|---|---|
| 50-18780 | 2/1975 | Japan | 534/788 |
| 58-129061 | 8/1983 | Japan | 534/788 |
| 59-227950 | 12/1984 | Japan | 534/788 |
| 60-108469 | 6/1985 | Japan | 534/788 |
| 94/08797 | 4/1994 | WIPO . | |

OTHER PUBLICATIONS

Chemical Abstracts, AN 103:161870, JP 60108469, Jun. 13, 1985.
Chemical Abstracts, AN 102:168305, JP 59227950, Dec. 21, 1984.
Chemical Abstracts, AN 100:35832, JP 58129061, Aug. 1, 1983.
Chemical Abstracts, AN 83:81196, JP 50021029, Mar. 6, 1975.

*Primary Examiner*—Fiona T. Powers
*Attorney, Agent, or Firm*—Oblon, Spivak, McClelland, Maier & Neustadt, P.C.

[57] ABSTRACT

A benzothiazole azo dye for thermal transfer recording of the following formula (I):

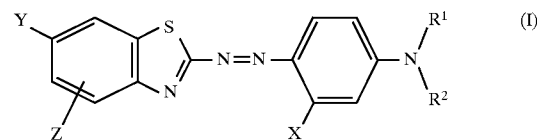

wherein $R^1$ is a $C_{3-8}$ branched chain alkyl group, $R^2$ is a substituted or unsubstituted alkyl group, X is a hydrogen atom, a lower alkyl group, a formylamino group, a lower alkylcarbonylamino group, a lower alkoxycarbonylamino group or a benzoylamino group, Y is a chlorine atom or a bromine atom, and Z is a hydrogen atom, a chlorine atom or a bromine atom.

23 Claims, No Drawings

BENZOTHIAZOLE AZO DYE AND THERMAL TRANSFER SHEET EMPLOYING IT

The present invention relates to a benzothiazole azo dye useful for thermal transfer recording of dye-transferring type, and a thermal transfer sheet employing such a dye.

Color recording techniques by electrophotography, ink jet recording and thermal transfer recording have been studied for color recording by printers, copying machines, facsimile machines, etc. which have been very much in demand in recent years.

The thermal transfer system is advantageous over other systems, since the maintenance and operation of the apparatus are simple, and the apparatus and expendable supplies are inexpensive.

The thermal transfer recording system includes a melt transfer system wherein a transfer sheet having a thermally meltable ink layer formed on a base film, is heated by a thermal head to melt the ink for transfer recording on an image-receiving sheet, and a dye transfer system wherein a thermal transfer sheet having an ink layer (a colorant layer) containing a thermally transferable dye formed on a base film, is heated by a thermal head to let the dye sublimate and/or thermally diffuse for transfer recording on an image-receiving sheet. The dye transfer system is particularly advantageous for full color recording, since it is possible to control the amount of the dye to be transferred by changing the energy given to the thermal head, whereby gradation recording will be easy. When a dye is to be applied to this recording system, the dye is required to satisfy the following conditions.

① It readily sublimates or thermally diffuses under the operational condition of the thermal recording head.
② It undergoes no thermal decomposition under the operational condition of the thermal recording head.
③ It has a desirable color for color reproduction.
④ It has a large molecular extinction coefficient.
⑤ It is stable against heat, light, moisture, chemicals, etc.
⑥ It is easy to prepare.
⑦ It is suitable for preparation of an ink.
⑧ It has no problem for safety.

As a dye to be used for this recording system, the present inventors have previously proposed a benzothiazole azo dye (JP-A-1-263082). Further, similar benzothiazole azo dyes are disclosed in JP-B-8-15814 and JP-A-8-505820. However, the requirements for properties demanded for thermal transfer recording are severe, and it has been desired to develop a dye having the color density, light resistance and color tone further improved over these conventional dyes.

The present inventors have conducted further studies on benzothiazole azo dyes and as a result, have found that a dye having certain specific substituents as defined in this application, has especially excellent properties as a dye of magenta color, as compared with conventional benzothiazole azo dyes which have been regarded as preferred.

It is an object of the present invention to provide a dye of magenta color having excellent properties with respect to the color density, light resistance and color tone, as a dye useful for thermal transfer recording of dye transfer system, and a thermal transfer sheet employing it.

The present invention provides a benzothiazole azo dye for thermal transfer recording of the following formula (I):

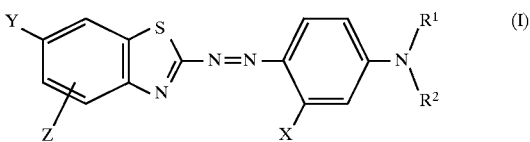

wherein $R^1$ is a $C_{3-8}$ branched chain alkyl group, $R^2$ is a substituted or unsubstituted alkyl group, X is a hydrogen atom, a lower alkyl group, a formylamino group, a lower alkylcarbonylamino group, a lower alkoxycarbonylamino group or a benzoylamino group, Y is a chlorine atom or a bromine atom, and Z is a hydrogen atom, a chlorine atom or a bromine atom.

The present invention also provides a thermal transfer sheet comprising a base film and an ink layer comprising a dye and a binder, formed on the base film, wherein at least one benzothiazole azo dye as defined above is contained as the dye.

Now, the present invention will be described in detail with reference to the preferred embodiments.

The dye of the present invention is one represented by the above formula (I) and is characterized in that it has a $C_{3-8}$ branched chain alkyl group as represented by $R^1$, a substituted or unsubstituted alkyl group as represented by $R^2$, and a chlorine atom or a bromine atom as represented by Y.

In the formula (I), $R^1$ is a $C_{3-8}$ branched chain alkyl group, which includes, for example, the following branched alkyl groups: $-CH(CH_3)_2$, $-CH_2CH(CH_3)_2$, $-CH(CH_3)C_2H_5$, $-C(CH_3)_3$, $-CH_2CH_2CH(CH_3)_2$, $-C(CH_3)_2C_2H_5$, $-CH(CH_3)C_4H_9(n)$, $-CH(C_2H_5)C_3H_7(n)$, $-CH(CH_3)C_5H_{11}(n)$, $-CH(C_2H_5)C_4H_9(n)$, $-CH(C_3H_7-n)_2$, $-C(C_2H_5)_3$, $-CH(C_2H_5)C_5H_{11}(n)$, $-CH(C_3H_7-n)C_4H_9(n)$, and $-CH_2CH(C_2H_5)C_4H_9(n)$. Among these branched alkyl groups, an alkyl group branched at the β-position, such as $-CH_2CH(CH_3)_2$ or $-CH_2CH(C_2H_5)C_4H_9(n)$ is preferred to an alkyl group branched at the α-position, as the synthesis is easy.

The alkyl group represented by $R^2$ in the formula (I) may be a $C_{1-8}$ straight chain or branched chain alkyl group. Such an alkyl group may be substituted by a hydroxyl group, an amino group, a halogen atom, a $C_{1-8}$ alkoxy group, a $C_{2-8}$ alkoxyalkoxy group, a phenoxy group, an allyloxy group, a $C_{2-8}$ acyloxy group, a $C_{2-8}$ alkoxycarbonyl group, a $C_{2-8}$ alkoxycarbonyloxy group, a phenyl group or a hetero ring.

Specific examples of the alkyl group substituted by a hydroxy group, include a 2-hydroxyethyl group, a 3-hydroxypropyl group, a 2-hydroxypropyl group and a 4-hydroxybutyl group.

Specific examples of the alkyl group substituted by an amino group, include a 2-aminoethyl group, a 2-methylaminoethyl group, and a 2-dimethylaminoethyl group.

Specific examples of the alkyl group substituted by a halogen atom, include a 2-chloroethyl group, a 3-chloropropyl group, a 2-chloropropyl group and a 2,2,2-trifluoroethyl group.

Specific examples of the alkyl group substituted by a $C_{1-8}$ alkoxy group, include a 2-methoxyethyl group, a 2-ethoxyethyl group, a 2-n-propoxyethyl group, a 2-n-butoxyethyl group, a 2-i-butoxyethyl group, a 2-i-propoxyethyl group, a 2-(2-ethylhexyloxy)ethyl group, a 1-methyl-2-ethoxyethyl group, a 3-methoxypropyl group, a 3-ethoxybutyl group, and a 1-ethyl-2-methoxyethyl group.

Specific examples of the alkyl group substituted by a $C_{2-8}$ alkoxyalkoxy group, include a 2-(2-methoxyethoxy)ethyl group, a 2-(2-ethoxyethoxy)ethyl group, a 2-(2-n-propoxyethoxy)ethyl group, and a 2-(2-i-propoxyethoxy)ethyl group.

Specific examples of the alkyl group substituted by a phenoxy group or an allyloxy group, include a 2-phenoxyethyl group, and a 2-allyloxyethyl group.

Specific examples of the alkyl group substituted by a $C_{2-8}$ acyloxy group, include alkyl groups substituted by a lower alkylcarbonyloxy group which may have a substituent such as a halogen atom, such as a 2-acetyloxyethyl group, a 2-propyonyloxyethyl group, a 2-i-butyryloxyethyl group, a 2-n-butyryloxyethyl group, and a 2-trifluoroacetyloxyethyl group.

Specific examples of the alkyl group substituted by a $C_{2-8}$ alkoxycarbonyl group, include a 2-methoxycarbonylethyl group, a 2-ethoxycarbonylethyl group and a 2-n-butoxycarbonylethyl group.

Specific examples of the alkyl group substituted by a $C_{2-8}$ alkoxycarbonyloxy group, include a 2-methoxycarbonyloxyethyl group, a 2-ethoxycarbonyloxyethyl group, a 2-n-butoxycarbonyloxyethyl group, a 2-(2-ethylhexyloxycarbonyloxy)ethyl group, a 2-benzyloxycarbonyloxyethyl group, and a 2-furfuryloxycarbonyloxyethyl group.

Specific examples of the alkyl group substituted by a phenyl group, include a benzyl group, and a 2-phenylethyl group.

Specific examples of the alkyl group substituted by a hetero ring, include alkyl groups substituted by a hetero single ring containing an oxygen atom or a sulfur atom, such as a furfuryl group, a tetrahydrofurfuryl group, and a 2-thienyl group.

The lower alkyl group, the lower alkylcarbonylamino group or the lower alkoxycarbonylamino group represented by X in the formula (I), may be a $C_{1-4}$ straight chain or branched chain alkyl group, the alkylcarbonylamino group or the alkoxycarbonylamino group, in which the alkyl moiety is a $C_{1-4}$ straight chain or branched chain alkyl group, respectively.

Among the benzothiazole azo dyes of the present invention, preferred is one having the above formula (I) wherein $R^1$ is a $C_{3-8}$ branched chain alkyl group, $R^2$ is a $C_{2-8}$ alkyl group, or a $C_{2-4}$ alkyl group substituted by a $C_{1-4}$ alkoxy group, an allyloxy group or a phenoxy group, X is a methyl group or an acetylamino group, Y is a chlorine atom, and Z is a hydrogen atom or a chlorine atom. Particularly preferred is one wherein $R^1$ is an isobutyl group or a 2-ethylhexyl group, or one wherein $R^2$ is a branched alkyl group.

The benzothiazole azo dye of the formula (I) can be prepared, for example, by diazotizing a 2-aminobenzothiazole of the following formula (II);

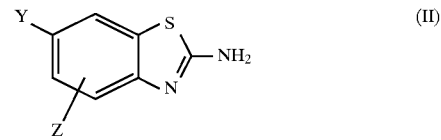

wherein Y and Z are as defined in the above formula (I), by a usual method, followed by coupling with an aniline of the following formula (III):

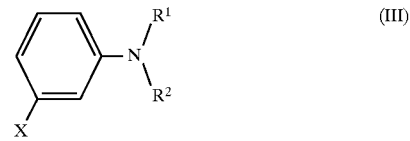

wherein $R^1$, $R^2$ and X are as defined above in the formula (I), by a usual method.

Specific examples of the 2-aminobenzothiazole of the formula (II) include 2-amino-6-chlorobenzothiazole, 2-amino-5,6-dichlorobenzothiazole, 2-amino-6,7-dichlorobenzothiazole, 2-amino-4,6-dichlorobenzothiazole, 2-amino-6-bromobenzothiazole, 2-amino-4,6-dibromobenzothiazole, 2-amino-5,6-dibromobenzothiazole, and 2-amino-6,7-dibromobenzothiazole.

Specific examples of the dye of the formula (I) will be given in Table 1. However, it should be understood that the dye of the present invention is not limited to such specific examples.

TABLE 1

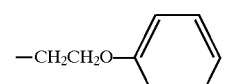

| No. | X | Y | Z | $R^1$ | $R^2$ |
|---|---|---|---|---|---|
| 1 | —NHCOCH$_3$ | —Cl | —H | —C$_4$H$_9$(i) | —C$_4$H$_9$(i) |
| 2 | —CH$_3$ | —Cl | —H | —C$_4$H$_9$(i) | —C$_4$H$_9$(i) |
| 3 | —CH$_3$ | —Cl | —H | —C$_4$H$_9$(i) | —C$_2$H$_5$ |
| 4 | —NHCOCH$_3$ | —Cl | —H | —C$_4$H$_9$(i) | —C$_2$H$_5$ |
| 5 | —CH$_3$ | —Cl | —Cl*$^1$ | —C$_4$H$_9$(i) | —C$_4$H$_9$(i) |
| 6 | —NHCOCH$_3$ | —Cl | —Cl*$^1$ | —C$_4$H$_9$(i) | —C$_4$H$_9$(i) |
| 7 | —CH$_3$ | —Cl | —H | —CH$_2$CH(C$_2$H$_5$)C$_4$H$_9$(n) | —C$_2$H$_5$ |
| 8 | —CH$_3$ | —Cl | —H | —C$_4$H$_9$(i) | —CH$_2$CH$_2$OH |
| 9 | —CH$_3$ | —Cl | —H | —C$_4$H$_9$(i) | —CH$_2$CH$_2$NHC$_2$H$_5$ |
| 10 | —CH$_3$ | —Cl | —H | —C$_4$H$_9$(i) | —CH$_2$CH$_2$Cl |
| 11 | —CH$_3$ | —Cl | —H | —C$_4$H$_9$(i) | —CH$_2$CH$_2$OCH$_3$ |
| 12 | —CH$_3$ | —Cl | —H | —C$_4$H$_9$(i) | —CH$_2$CH$_2$OCH$_2$CH$_2$OCH$_3$ |
| 13 | —CH$_3$ | —Cl | —H | —C$_4$H$_9$(i) | —CH$_2$CH$_2$O—⟨phenyl⟩ |

TABLE 1-continued $$\text{structure: benzothiazole with Y at 6-position, Z at 5-position, S and N in thiazole ring, connected via } N=N \text{ to phenyl with X substituent and } NR^1R^2 \text{ group}$$

| No. | X | Y | Z | $R^1$ | $R^2$ |
|---|---|---|---|---|---|
| 14 | —$CH_3$ | —Cl | —H | —$C_4H_9(i)$ | —$CH_2CH_2OCH_2$—$CH=CH_2$ |
| 15 | —$CH_3$ | —Cl | —H | —$C_4H_9(i)$ | —$CH_2CH_2OCOCH_3$ |
| 16 | —$CH_3$ | —Cl | —H | —$C_4H_9(i)$ | —$CH_2CH_2COOC_2H_5$ |
| 17 | —$CH_3$ | —Cl | —H | —$C_4H_9(i)$ | —$CH_2CH_2OCOOC_2H_5$ |
| 18 | —$CH_3$ | —Cl | —H | —$C_4H_9(i)$ | —$CH_2CH_2$—(phenyl) |
| 19 | —$CH_3$ | —Cl | —H | —$C_4H_9(i)$ | —$CH_2$—(tetrahydrofuryl) |
| 20 | —$CH_3$ | —Cl | —H | —$C_4H_9(i)$ | —$CH_2CH(C_2H_5)C_4H_9(n)$ |
| 21 | —$CH_3$ | —Cl | —H | —$C_4H_9(i)$ | —$CH_2CH_2OC_4H_9(n)$ |
| 22 | —$CH_3$ | —Cl | —H | —$CH(CH_3)_2$ | —$C_2H_5$ |
| 23 | —$CH_3$ | —Cl | —H | —$CH(CH_3)C_4H_9(n)$ | —$C_2H_5$ |
| 24 | —$CH_3$ | —Cl | —H | —$C_4H_9(i)$ | —$C_2H_5$ |
| 25 | —$C_4H_9(n)$ | —Cl | —H | —$C_4H_9(i)$ | —$C_4H_9(i)$ |
| 26 | —$NHCOC_2H_5$ | —Cl | —H | —$C_4H_9(i)$ | —$C_4H_9(i)$ |
| 27 | —$NHCOOCH_3$ | —Cl | —H | —$C_4H_9(i)$ | —$C_4H_9(i)$ |
| 28 | —$NHCOC_4H_9(n)$ | —Cl | —H | —$C_4H_9(i)$ | —$C_4H_9(i)$ |
| 29 | —H | —Cl | —Cl*[2] | —$C_4H_9(i)$ | —$C_4H_9(i)$ |
| 30 | —H | —Cl | —Cl*[2] | —$CH_2CH(C_2H_5)C_4H_9(n)$ | —$C_2H_5$ |
| 31 | —$NHCOCH_3$ | —Cl | —H | —$CH_2CH(C_2H_5)C_4H_9(n)$ | —$C_2H_5$ |
| 32 | —$CH_3$ | —Cl | —Cl*[2] | —$CH_2CH(C_2H_5)C_4H_9(n)$ | —$C_2H_5$ |
| 33 | —$CH_3$ | —Cl | —Cl*[2] | —$CH_2CH(C_2H_5)C_4H_9(n)$ | —$CH_2CH_2OCOCH_3$ |
| 34 | —$NHCOCH_3$ | —Cl | —Cl*[2] | —$CH_2CH(C_2H_5)C_4H_9(n)$ | —$CH_2CH_2OCOCH_3$ |
| 35 | —$NHCOCH_3$ | —Cl | —H | —$CH_2CH(C_2H_5)C_4H_9(n)$ | —$CH_2CH_2OCH_3$ |
| 36 | —$CH_3$ | —Cl | —Cl*[2] | —$C_4H_9(i)$ | —$CH_2CH_2OC_2H_5$ |
| 37 | —$CH_3$ | —Cl | —Cl*[2] | —$C_4H_9(i)$ | —$CH_2CH_2OC_4H_9(n)$ |
| 38 | —$NHCOCH_3$ | —Cl | —Cl*[2] | —$C_4H_9(i)$ | —$CH_2CH_2OC_2H_5$ |
| 39 | —NHCHO | —Cl | —H | —$C_4H_9(i)$ | —$C_4H_9(i)$ |
| 40 | —NHCO—(phenyl) | —Cl | —H | —$C_4H_9(i)$ | —$C_4H_9(i)$ |
| 41 | —$CH_3$ | —Br | —H | —$C_4H_9(i)$ | —$C_4H_9(i)$ |
| 42 | —$CH_3$ | —Br | —Br*[2] | —$C_4H_9(i)$ | —$C_4H_9(i)$ |

*[1]Substituted at 5- and 7- positions.
*[2]Substituted at 4- position.

When the benzothiazole azo dye of the present invention is used as a dye for thermal transfer recording, it is usual that an ink having the dye dissolved or finely dispersed in a solvent together with the binder, is prepared, and the ink is coated on a base film, followed by drying to obtain a thermal transfer sheet.

The binder to be used for the preparation of the ink may, for example, be a water-soluble resin of e.g. cellulose type, acrylic acid type, starch type or an epoxy type, or a resin soluble in an organic solvent, such as an acrylic resin, a methacrylic resin, a polystyrene, a polycarbonate, a polysulfone, a polyethersulfone, a polyvinylbutyral, an ethylcellulose, an acetylcellulose, a polyester, an AS resin or a phenoxy resin.

The medium for the preparation of the ink may, for example, be, in addition to water, an alcohol such as methylalcohol, ethylalcohol, isopropylalcohol or isobutylalcohol, a cellosolve such as methylcellosolve or ethylcellosolve, an aromatic hydrocarbon such as toluene, xylene or chlorobenzene, an ester such as ethyl acetate or butyl acetate, a ketone such as acetone, methyl ethyl ketone, methyl isobutyl ketone or cyclohexanone, a chlorine type solvent such as methylene chloride, chloroform or trichloroethylene, an ether such as tetrahydrofuran or dioxane, or an organic solvent such as N,N-dimethylformamide or N-methylpyrrolidone.

In addition to the above components, organic or inorganic non-sublimable fine particles, a dispersant, an antistatic agent, a defoaming agent, an antioxidant, a release agent, a viscosity-regulating agent, etc., may be added to the above ink, as the case requires.

The base film on which the ink is coated to prepare a thermal transfer sheet, may be a thin paper such as condenser paper or glassine paper, or a plastic film having good heat resistance, such as polyester, polycarbonate, polyamide, polyimide or polyaramide. The thickness may be within a range of from 3 to 50 μm.

Among the base films, a polyester film, particularly a polyethylene terephthalate film, is especially advantageous from the viewpoint of the mechanical strength, solvent resistance and economical efficiency. However, in some cases, the polyethylene terephthalate film is not necessarily adequate in the heat resistance, and the running property of the thermal head tends to be inadequate. Accordingly, the running property of the thermal head may be improved by forming a heat resistance resin layer containing a wetting agent and highly lubricating heat resistant particles on the side opposite to the ink layer.

Coating of the ink on the base film can be carried out by means of a gravure coater, a reverse roll coater, a rod coater or an air doctor coater. The coating may be carried out so that the thickness of the coated layer of the ink would be within a range of from 0.1 to 5 μm after drying. An image-receiving sheet is put on the thermal transfer sheet, and then a thermal energy is applied by a heating means, so that the dye in the ink layer will be transferred to the image-receiving layer to form a record image.

The image-receiving sheet has a dye image-receiving layer on a support. Such a dye image-receiving layer comprises a binder resin and a compound capable of receiving the dye.

The binder resin to be used for such a dye image-receiving layer, may, for example, be a vinyl chloride or vinyl acetate resin, or the above mentioned binder resin useful for the preparation of the ink. The compound capable of receiving the dye, to be added to the resin, may, for example, be a high boiling point organic solvent disclosed in e.g. JP-A-62-174754. The thickness of the dye image-receiving layer is preferably from 0.2 to 40 μm, more preferably from 1 to 15 μm.

The support for the image-receiving sheet may, for example, be synthetic paper (of e.g. polyolefine or polystyrene type), cellulose paper, coated paper, a film of e.g. polyethylene, polypropylene, polyester (such as polyethylene terephthalate), polycarbonate or polyamide, or a laminated product thereof.

Now, the present invention will be described in further detail with reference to Examples. However, it should be understood that the present invention is by no means restricted to such specific Examples.

EXAMPLE 1

A solution having 18.5 g of 2-amino-6-chlorobenzothiazole dissolved in 100 ml of concentrated sulfuric acid, was added to 200 ml of water to obtain a suspension. This suspension was cooled to 0° C., and a nitrosylsulfuric acid solution (prepared from 60 ml of 95% sulfuric acid and 7.1 g of sodium nitrite) was dropwise added thereto at a temperature of from 0° to 5° C., followed by stirring at the same temperature for two hours for diazothization. On the other hand, 26.2 g of 3-acetylamino-N,N-diisobutylaniline was dissolved in a 15% sulfuric acid aqueous solution, and 1000 ml of water was added thereto, followed by cooling to 0° C. to obtain a solution. To this solution, the above diazotized solution was dropwise added at a temperature of from 0° to 5° C., followed by stirring at the same temperature for 3 hours for a coupling reaction. Precipitated crystals were collected by filtration, washed with water and methanol and then dried to obtain 35 g of red crystals as Dye No. 1 as identified in Table 1. The melting point of this dye was from 153° to 154° C., and λmax in acetone was 535 nm.

EXAMPLE 2

In the same manner as in Example 1, the following dyes were prepared. Their melting points and λmax in acetone are shown in Table 2. Here, Dye No. corresponds to No. in Table 1.

TABLE 2

| Dye No. | Melting point (°C.) | λmax (nm) |
|---|---|---|
| No. 2 | 122–123 | 531 |
| No. 3 | 111–112 | 527 |
| No. 7 | 74–75 | 530 |

EXAMPLE 3

Using Dye No. 1 as identified in Table 1, the following transfer recording test was carried out.

a) Preparation of an ink

| | |
|---|---|
| Dye | 6 parts by weight |
| AS resin (Denka AS-S, product name, manufactured by Denki Kagaku Kogyo K.K.) | 10 parts by weight |
| Methyl ethyl ketone | 24 parts by weight |
| Toluene | 60 parts by weight |
| Total | 100 parts by weight |

A mixture having the above composition was treated by a paint conditioner for 10 minutes to obtain an ink.

b) Preparation of a thermal transfer sheet

Using a wire bar, the above ink was coated on a polyethylene terephthalate film (thickness: 6 μm) having heat resistant lubricating treatment applied to the rear side and dried (dried film thickness: about 1 μm) to obtain a thermal transfer sheet. Here, the heat resistant lubricating treatment of the polyethylene terephthalate film was carried out by coating a liquid comprising 10 parts by weight of an acrylic resin (BR-80, tradename, manufactured by Mitsubishi Rayon Co., Ltd.), 1 part by weight of amino-modified silicone oil (KF393, tradename, manufactured by Shin-Etsu Chemical Industry Co., Ltd.) and 89 parts by weight of toluene, on a polyethylene terephthalate film, followed by drying (dried film thickness: about 1 μm).

c) Preparation of an image-receiving sheet

A liquid comprising 70 parts by weigh of a polyvinyl phenylacetal resin, 30 parts by weight of a vinyl chloride/vinyl acetate/vinyl alcohol copolymer resin (Eslec A, tradename, manufactured by Sekisui Kagaku Kogyo K.K.), 30 parts by weight of silicone varnish (TSR-160, tradename, solid content concentration: 60%, xylene: 40%, manufactured by Toshiba Silicone K.K.), 15 parts by weight of a hexamethylene diisocyanate compound (Mytec NY-710A, tradename, solid content concentration: 75%, ethyl acetate: 25%, manufactured by Mitsubishi Chemical Corporation), 2.5 parts by weight of amino-modified silicone (KF393, tradename, manufactured by Shin-Etsu Chemical Industry Co., Ltd.), 600 parts by weight of methyl ethyl ketone and 600 parts by weight of toluene, was coated on synthetic paper (Yupo FPG150. tradename, manufactured by Oji Yuka Synthetic Paper Co., Ltd.) by a wire bar, then dried (dried film thickness: about 5 μm) and further treated in an oven at 80° C. for 30 minutes to obtain an image-receiving sheet.

d) Transfer recording test

The ink coated side of the above thermal transfer sheet was laid on the image-receiving sheet, and recording was carried out under the following conditions by means of a thermal head, to obtain a record of magenta color. The color density of the record was measured by means of densitometer TR-927, manufactured by Macbeth Company. The color density was 2.5.

Recording conditions

Main scanning and subsidiary scanning recording density: 6 dots/mm

Recording power: 0.2 W/dot

Power application time: 13 msec f) Light resistance test

The light resistance test of the record obtained as described above, was carried out (black panel temperature: 63±2° C.) by means of a xenon lamp fade mater (manufactured by Suga Shikenki K.K.), and the degree of the color fading of the record after irradiation for 80 hours [ΔE(L*a*b)] was measured. The result was 5.0.

EXAMPLE 4

The transfer recording test and the light resistance test were carried out in the same manner as in Example 3 except that instead of Dye No. 1 in Table 1, Dye No. 2 was used. As a result, the color density of the record was 2.7, and the degree of the color fading of the record was 5.5.

EXAMPLE 5

The transfer recording test and the light resistance test were carried out in the same manner as in Example 3 except that instead of Dye No. 1 in Table 1, Dye No. 3 was used. As a result, the color density of the record was 2.6, and the degree of the color fading of the record was 6.5.

EXAMPLE 6

The transfer recording test and the light resistance test were carried out in the same manner as in Example 3 except that instead of Dye No. 1 in Table 1, Dye No. 7 was used. As a result, the color density of the record was 2.8, and the degree of the color fading of the record was 6.5.

EXAMPLE 7

The transfer recording test and the light resistance test were carried out in the same manner as in Example 3 except that instead of Dye No. 1 in Table 1, Dye No. 5 (λmax in acetone: 540 nm, this dye was prepared by diazotizing a 1:1 mixture of 2-amino-5,6-dichlorobenzothiazole and 2-amino-6,7-dichlorobenzothiazole, followed by coupling with N,N-diisobutyl-m-toluidine) was used. As a result, the color density of the record was 2.5, and the degree of the color fading of the record was 5.0.

EXAMPLE 8

The transfer recording test and the light resistance test were carried out in the same manner as in Example 1 except that instead of Dye No. 1 in Table 1, Dye No. 6 (λmax in acetone: 538 nm, and this dye was prepared by diazotizing a 1:1 mixture of 2-amino-5,6-dichlorobenzothiazole and 2-amino-6,7-dichlorobenzothiazole, followed by coupling with m-N,N-diisobutylaminoacetoanilide) was used. As a result, the color density of the record was 2.3, and the degree of the color fading of the record was 4.5.

EXAMPLE 9

The transfer recording test and the light resistance test were carried out in the same manner as in Example 3 except that instead of Dye No. 1 in Table 1, Dye No. 41 (λmax in acetone: 530 nm) was used. As a result, the color density of the record was 2.3, and the degree of the color fading of the record was 5.5.

The results of Examples 3 to 9 are shown in the following Table 3.

TABLE 3

| | Dye No. | Color density of the record | Degree of the color fading of the record |
|---|---|---|---|
| Example 3 | 1 | 2.5 | 5.0 |
| Example 4 | 2 | 2.7 | 5.5 |
| Example 5 | 3 | 2.6 | 6.5 |
| Example 6 | 4 | 2.8 | 6.5 |
| Example 7 | 5 | 2.5 | 5.0 |
| Example 8 | 6 | 2.3 | 4.5 |
| Example 9 | 41 | 2.3 | 5.5 |

Further, in Examples 3 to 9, the color tones of the records were all clear magenta colors.

Comparative Examples 1 to 6

The transfer recording tests and the light resistance tests were carried out in the same manner as in Example 3 using the following dyes disclosed in Examples of JP-A-1-263082. The results are shown in Table 4.

TABLE 4

| No. | Tested dye (dye disclosed in JP-A-1-263082) | Color density of the record | Degree of the color fading of the record |
|---|---|---|---|
| Comparative Example 1 | Dye disclosed in Example 1 | 1.8 | 10.5 |
| Comparative Example 2 | Dye disclosed in Example 2-1 | 2.4 | 13.5 |
| Comparative Example 3 | Dye disclosed in Example 2-2 | 2.4 | 14.5 |
| Comparative Example 4 | Dye disclosed in Example 2-15 | 2.6 | 15.5 |
| Comparative Example 5 | Dye disclosed in Example 2-35 | 1.5 | 10.5 |
| Comparative Example 6 | Dye disclosed in Example 2-39 | 2.2 | 15.0 |

The structures of the dyes used in the comparative tests (Comparative Examples 1 to 6) are as follows.

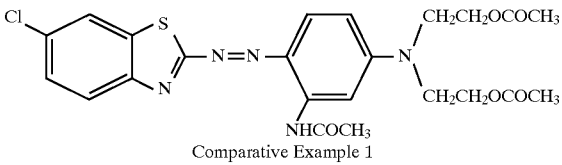

Comparative Example 1

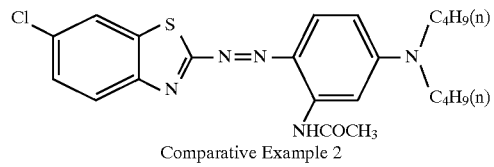

Comparative Example 2

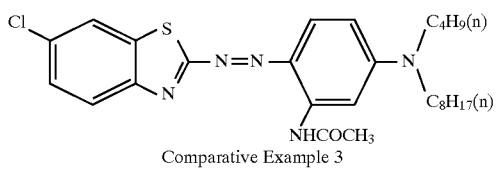

Comparative Example 3

-continued

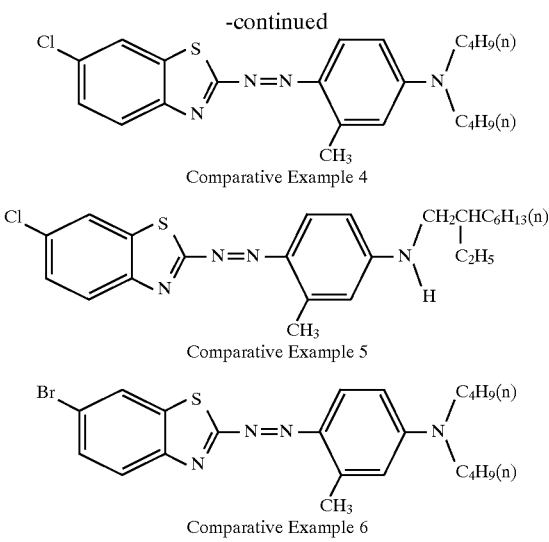

Comparative Example 4

Comparative Example 5

Comparative Example 6

From the results of Tables 3 and 4, it is evident from the comparison between Dye No. 7 (Example 6) and the dye of Comparative Example 5 that the color density and the light resistance of the record are remarkably improved by using the dye of the formula (I) of the present invention in which $R^1$ is a $C_8$ branched chain alkyl group, and $R^2$ is an alkyl group.

Comparative Examples 7 and 8

The transfer recording tests and the light resistance tests were carried out in the same manner as in Example 3 by using the following dyes (Comparative Examples 7 and 8). The results are shown in Table 5 together with the results (Example 4) in the case where the Dye No. 2 was used.

TABLE 5

| | Dye | Color density | Degree of the color fading of the record | Color tone of the record |
| --- | --- | --- | --- | --- |
| Example 4 | No. 2 | 2.7 | 5.5 | Clear magenta color |
| Comparative Example 7 | Comparative Example 7 | 2.2 | 5.7 | Purple color |
| Comparative Example 8 | Comparative Example 8 | 1.6 | 13.3 | Dark reddish purple color |

The structures of the dyes used in the comparative tests (Comparative Examples 7 and 8) are as follows.

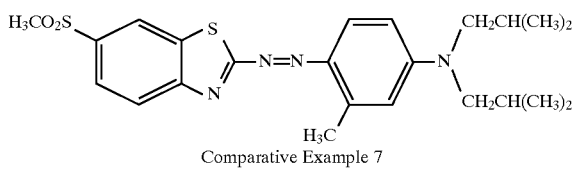

Comparative Example 7

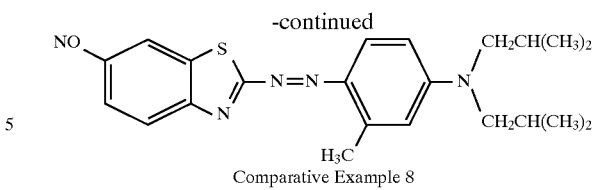

Comparative Example 8

From the results of Table 5, it is evident from the comparison between Dye No. 2 (Example 4) of the present invention and the dyes of Comparative Examples 7 and 8 that all of the color density, light resistance and color tone of the record are excellent by using a dye of the formula (I) of the present invention wherein Y is a chlorine atom.

With respect to conventional azo dyes, for example, JP-B-8-15814 discloses that when a dye having a benzothiazolyl group is employed, the substituent at its 6-position is preferably a thiocyano group. However, the present inventors have found that a dye having a specific structure which has a chlorine atom or a bromine atom instead of the thiocyano group at the 6-position of the benzothiazoyl group as shown in the formula (I) and wherein $R^1$ is a $C_{3-8}$ branched chain alkyl group, and $R^2$ is an alkyl group, is an excellent dye satisfying all of the color density, light resistance and color tone required for a dye for thermal transfer recording.

When the thermal transfer sheet of the present invention is used, a record of clear magenta color with high density can be obtained with a low energy, and the light resistance of the record is good. The dye of the present invention exhibits excellent properties as compared with other dyes of similar structures, by virtue of the feature that it has a $C_{3-8}$ branched chain alkyl group represented by $R^1$, a substituted or unsubstituted alkyl group represented by $R^2$, and a chlorine atom or a bromine atom represented by Y.

What is claimed is:

1. A benzothiazole azo dye for thermal transfer recording of the following formula (I):

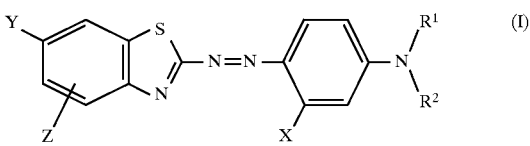

wherein $R^1$ is a $C_{3-8}$ branched chain alkyl group, $R^2$ is a substituted alkyl group wherein the substituents are selected from the group consisting of a hydroxy group, an amino group, a halogen atom, a $C_{1-8}$ alkoxy group, a $C_{2-8}$ alkoxyalkoxy group, an allyloxy group, a $C_{2-8}$ acyloxy group, a $C_{2-8}$ alkoxycarbonyl group, a $C_{2-8}$ alkoxycarbonyloxy group and a hetero ring, X is a lower alkyl group, a formylamino group, a lower alkoxycarbonylamino group or a benzoylamino group, Y is a chlorine atom or a bromine atom, and Z is a hydrogen atom, a chlorine atom or a bromine atom.

2. The benzothiazole azo dye for thermal transfer recording according to claim 1, wherein $R^2$ is a $C_{1-8}$ alkyl group which may be substituted by a group selected from the group consisting of a hydroxy group, an amino group, a halogen atom, a $C_{1-8}$ alkoxy group, a $C_{2-8}$ alkoxyalkoxy group, a phenoxy group, an allyloxy group, a $C_{2-8}$ acyloxy group, a $C_{2-8}$ alkoxycarbonyl group, a $C_{2-8}$ alkoxycarbonyloxy group, a phenyl group and a hetero ring.

3. The benzothiazole azo dye for thermal transfer recording according to claim 1, wherein $R^2$ is a $C_{2-8}$ alkyl group which may be substituted by a group selected from the group consisting of a $C_{1-8}$ alkoxy group, an allyloxy group and a phenoxy group.

4. The benzothiazole azo dye for thermal transfer recording according to claim 1, wherein $R^2$ is a $C_{2-4}$ alkyl group which may be substituted by a group selected from the group consisting of a $C_{1-4}$ alkoxy group, an allyloxy group and a phenoxy group.

5. The benzothiazole azo dye for thermal transfer recording according to claim 1, wherein $R^2$ is a $C_{2-8}$ branched alkyl group.

6. The benzothiazole azo dye for thermal transfer recording according to claim 1, wherein $R^1$ is a $C_{3-8}$ alkyl group branched at the β-position.

7. The benzothiazole azo dye for thermal transfer recording according to claim 6, wherein $R^1$ is an isobutyl group or a 2-ethylhexyl group.

8. The benzothiazole azo dye for thermal transfer recording according to claim 1, wherein X is a $C_{1-4}$ alkyl group.

9. The benzothiazole azo dye for thermal transfer recording according to claim 1, wherein Y is a chlorine atom.

10. The benzothiazole azo dye for thermal transfer recording according to claim 1, wherein $R^2$ is a $C_{2-8}$ branched alkyl group, and Y is a chlorine atom.

11. The benzothiazole azo dye for thermal transfer recording according to claim 1, wherein Z is a hydrogen atom or a chlorine atom.

12. A thermal transfer sheet comprising a base film and an ink layer comprising a dye and a binder, formed on the base film, wherein at least one benzothiazole azo dye of the following formula (I) is present:

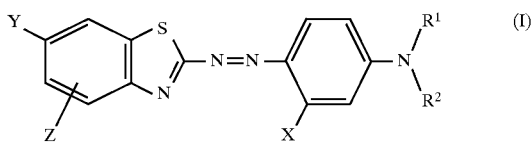

wherein $R^1$ is a $C_{3-8}$ branched chain alkyl group, $R^2$ is a substituted or unsubstituted alkyl group, X is a hydrogen atom, a lower alkyl group, a formylamino group, a lower alkylcarbonylamino group, a lower alkoxycarbonylamino group or a benzoylamino group, Y is a chlorine atom or a bromine atom, and Z is a hydrogen atom; a chlorine atom or a bromine atom.

13. The thermal transfer sheet according to claim 12, wherein the base film is made of a polyethylene terephthalate.

14. The thermal transfer sheet according to claim 12, wherein $R^2$ is a $C_{1-8}$ alkyl group which may be substituted by a group selected from the group consisting of a hydroxy group, an amino group, a halogen atom, a $C_{1-8}$ alkoxy group, a $C_{2-8}$ alkoxyalkoxy group, a phenoxy group, an allyloxy group, a $C_{2-8}$ acyloxy group, a $C_{2-8}$ alkoxycarbonyl group, a $C_{2-8}$ alkoxycarbonyloxy group, a phenyl group and a hetero ring.

15. The thermal transfer sheet according to claim 12, wherein $R^2$ is a $C_{2-8}$ alkyl group wich may be substituted by a group selected from the group consisting of a $C_{1-8}$ alkoxy group, an allyloxy group and a phenoxy group.

16. The thermal transfer sheet according to claim 12, wherein $R^2$ is a $C_{2-4}$ alkyl group which may be substituted by a group selected from the group consisting of a $C_{1-4}$ alkoxy group, an allyloxy group and a phenoxy group.

17. The thermal transfer sheet according to claim 12, wherein $R^2$ is a $C_{2-8}$ branched alkyl group.

18. The thermal transfer sheet according to claim 12, wherein $R^1$ is a $C_{3-8}$ alkyl group branched at the β-position.

19. The thermal transfer sheet according to claim 18, wherein $R^1$ is an isobutyl group or a 2-ethylhexyl group.

20. The thermal transfer sheet according to claim 12, wherein X is a $C_{1-4}$ alkyl group or an alkylcarbonylamino group wherein the alkyl moiety is a $C_{1-4}$ alkyl group.

21. The thermal transfer sheet according to claim 12, wherein Y is a chlorine atom.

22. The thermal transfer sheet according to claim 12, wherein $R^2$ is a $C_{2-8}$ branched alkyl group, and Y is a chlorine atom.

23. The thermal transfer sheet according to claim 12, wherein Z is a hydrogen atom or a chlorine atom.

* * * * *